Patented Mar. 6, 1945

2,371,119

UNITED STATES PATENT OFFICE 2,371,119

PROCESS OF RECOVERING PRECIOUS METALS

Frederick C. Nachod, Mount Holly, N. J., assignor to The Permutit Company, New York, N. Y., a corporation of Delaware No Drawing. Application March 28, 1942, Serial No. 436,684

7 Claims. (Cl. 75—108)

This invention relates to a process of recovering precious metals; and it comprises recovering precious metals from aqueous liquids containing such metals in the form of anions of a complex acid by placing said liquid in contact with anion removal material whereby said metal is taken up by said anion removal material, then removing said liquid from contact with said anion removal material, and then separating said metal from said anion removal material; all as more fully described hereinafter and as claimed.

In many industrial fields it is desirable to recover precious metals from dilute aqueous solutions in which such metals are present in the form of anions of a complex acid, such as spent plating liquors and refinery waste solutions. Heretofore two types of processes have been resorted to to accomplish such recovery. In the one type of process the aqueous liquid is subjected to electrolysis and the metal is plated out on a cathode and thereby recovered. This process is very slow especially when applied to the rather dilute solutions which as a rule have to be dealt with. Moreover, it is almost impossible to effect complete recovery. In the other such method substances such as metals more electronegative than those to be recovered, or other chemicals are added to the liquid whereby the precious metal is precipitated. This process is likewise very slow and entails the further difficult problem of removing relatively small quantities of precipitated metal from relatively large quantities of liquid.

It is an object of my invention to recover precious metals from aqueous solutions in which they are present in the form of anions of complex acids more quickly and more economically than has been possible heretofore. Another object is to provide a process which permits recovery that is practically complete, a feature not possible with the processes of recovery known in the past.

These objects are achieved in a new process according to my invention in which anion removal material is utilized. In recent years various materials have come to be known in the art of water treatment for removing acids from water and are usually referred to as anion removal material or anion absorbing material. Whether these materials actually remove the molecular acid from the water or remove simply the anions of the acid in exchange for hydroxyl ions is not definitely known. This is also true with respect to the materials the use of which is contemplated in practicing my invention and, therefore, when the term "anion removal material" is used herein, it is used in its broad sense and intended to cover a material that may operate either way. An efficient anion removal material should be relatively insoluble in water, dilute acids or dilute alkalies, capable of being regenerated with a solution of a base, and have physical properties that permit its use in the form of a bed of granules. Anion removal materials meeting these requirements are certain synthetic resins such amine-formaldehyde resins and other amino nitrogen-containing compounds, or other types of acid absorbing materials frequently referred to as anion removal materials, e. g. aniline black or emeraldine, keratiniferous materials, such as wool, and the like.

By precious metals for the recovery of which my process can be used, I mean gold and the metals of the platinum group, i. e. iridium, osmium, palladium, platinum, rhodium and ruthenium.

In order to be susceptible of recovery in accordance with my process these metals must be present in the solution in the form of anions of complex acids, that is anions containing Cl, CN, or the like, in addition to the precious metal.

According to my invention the aqueous liquid containing the precious metal to be recovered in the form of the anion of a complex acid is brought in contact with anion removal material. The anions are thereby taken up by the anion removal material. Regardless of how dilute the solution is the removal of anions from the solution is complete so far as can be determined with standard chemical methods. The remaining liquid is then removed from the anion removal material. This may be continued until the limit of the capacity of the material to remove anions has been reached. Thereupon it remains to separate the precious metal from the anion removal material and this may be done in either one of two ways.

The anion removal material may be heated in the presence of oxygen or air to a temperature high enough to cause it to ignite and burn. The anion removal material is thus transformed into gases which escape. The precious metal in most cases will remain behind as a solid residue in powder form. Since this residue will contain any ashes that may have been present in the anion removal material, it is desirable in this method to use an anion removal material which has a low ash content. In the combustion process the recovered metal may become oxidized to some extent, and it can then, if desired, be further refined by removing the oxides and ashes in known ways.

In the case of osmium and ruthenium combustion of the anion removal material causes complete oxidation of the metal and the resulting oxides are vaporized. These metal oxide vapors may be recovered from the gas mixture in which they are present by cooling the gases to a temperature low enough to bring about condensation of the metal oxides. As an alternative, the metal oxide vapors may be recovered by absorption by bringing the gases in contact with a suitable absorbent such as a solution of potassium hydroxide.

The other method of separating the precious metal from the anion removal material consists in treating the anion removal material with a solution of alkali such as ammonium hydroxide, sodium carbonate, etc. whereby the precious metal goes into solution in the form of a complex salt and the anion removal material becomes regenerated so that it can be used for removing a further quantity of metal from solutions. The treating solution containing the metal salt may then be evaporated leaving as residue the metal salt as well as a certain excess of treating chemical from which the metal can be separated by well known methods. In the event that ammonium hydroxide is used the evaporation drives off the excess treating chemical in the form of ammonia leaving behind the metal salt; further heating of this residual salt will break the salt down and leave the pure metal.

In this method of separating the precious metal from the anion removal material by treatment with an alkali solution only a portion of the metal taken up by the anion removal material is removed by the solution, a substantial part of the metal being tenaciously retained by the anion removal material. After the cyclic process of taking precious metal up by anion removal material and then transferring the metal to an alkali solution has been carried out a number of times the precious metal retained by the anion removal material and not removable therefrom by treatment with alkali solution can be recovered by the first mentioned method of separation, i. e. combustion of the anion removal material.

The anion removal material employed to take up the precious metal may either be used in the form of a bed of granules through which the solution is passed until the capacity of the anion removal material has been exhausted; or a quantity of the anion removal material may be agitated with a quantity of the liquid containing the precious metal in a batch process.

The following is an example of the process in accordance with my invention. A solution containing platinum as chloro-platinic acid in a concentration of 20 millimoles platinum per liter was passed downwardly through a bed of emeraldine at a rate of 10 cubic centimeters per minute. The bed had a volume of 53 cubic centimeters, the horizontal cross-sectional area being 2.8 square centimeters and the depth 19 centimeters, and the material weighed 11.6 grams on a dry basis. The effluent from the bed was found to be completely free of platinum until, after passage of 300 cubic centimeters, i. e. after lapse of 30 minutes, traces of platinum began to appear in the liquid leaving the bed. The run was then interrupted, the emeraldine was rinsed with distilled water, dried and heated in an open crucible until it ignited and burned. The residue was black metallic platinum powder to which was admixed some white substance which was found to be ash residue from the emeraldine. Quantitative determination of the recovered platinum showed 100% recovery, with a possible experimental error of about 3%. This test shows that 11.6 grams of emeraldine (dry basis) took up 6 millimoles of metallic platinum, or 1.17 grams. In other words, the emeraldine removed an amount of platinum equal to 10% of its own weight.

In a series of experiments a quantity of anion removal material and a quantity of solution containing precious metal as anions of a complex acid were placed in a container and agitated for two hours. Then the amount of precious metal taken up by the anion removal material was determined. The following table shows the capacities obtained in this manner when the residual concentration of the precious metal in solution amounted to one millimole per liter. As might be expected, the capacity determined in this manner is considerably higher than the capacity obtained in the previously described example in which the solution was passed through a bed of anion removal material at a relatively high rate of flow, and in which the run was interrupted as soon as the first trace of precious metal appeared in the effluent. However, the table is useful in showing the relative capacities obtained in the use of different anion removal materials for the recovery of various precious metals.

| Metal | Acid | Anion removal material | Capacity in percent of anion removal material |
|---|---|---|---|
| Platinum | $H_2PtCl_6$ | Emeraldine | 23.4 |
| Palladium | $H_2PdCl_4$ | ....do.... | 3.7 |
| Gold | $H AuCl_4$ | ....do.... | 18.7 |
| Platinum | $H_2PtCl_6$ | Synthetic resin | 43.0 |
| Palladium | $H_2PdCl_4$ | ....do.... | 7.5 |
| Gold | $H AuCl_4$ | ....do.... | 23.6 |

It is to be noted that the presence of base metals in the solution from which precious metal is to be recovered will not affect the effectiveness of my process. Base metals, as a rule, are present in solution as cations. They will, therefore, not be taken up by the anion removal material and will remain in the solution when it is removed from contact with the anion removal material. My process is thus well adapted for the recovery of precious metals from contaminated solutions. My process can, furthermore, be used with satisfactory results when a liquid contains precious metal in such great dilution that the recovery processes heretofore known are uneconomical.

While I have described what I consider the most advantageous ways of carrying out my invention, modifications may be made without departing from the spirit of my invention and reference is therefore made to the appended claims for a definition of the scope of my invention.

What I claim is:

1. A process of recovering precious metal from an aqueous liquid containing said metal in the form of anions of a complex acid which comprises placing said liquid in contact with a solid organic anion removal material containing a basic nitrogen group and capable of being regenerated with a solution of alkali whereby said metal in the form of an anionic complex is taken up by said anion removal material, then removing said liquid from contact with said anion removal material, and then separating the metal values from said anion removal material.

2. A process of recovering precious metal from an aqueous liquid containing said metal in the form of anions of a complex acid which comprises placing said liquid in contact with a solid combustible anion removal material having a basic nitrogen group and capable of being regenerated with a solution of alkali substantially free of ash whereby said metal in the form of an anionic complex is taken up by said anion removal material, then removing said liquid from contact with said anion removal material, and then heating said anion removal material to a temperature high enough to cause combustion and escape thereof in gaseous form.

3. A process of recovering precious metal from an aqueous solution containing said metal in the form of anions of a complex acid which comprises placing said liquid in contact with a solid organic anion removal material having a basic nitrogen group, substantially insoluble in a solution of alkali and capable of being regenerated with a solution of alkali whereby said metal is taken up by said anion removal material, removing said liquid from contact with said anion removal material, bringing the solution of an alkali in contact with said anion removal material whereby the precious metal in the form of an anionic complex is taken up by said solution, removing said solution from contact with said anion removal material, then evaporating said solution and heating the residue obtained by said evaporation until precious metal is obtained as metal values.

4. A process of recovering platinum from an aqueous liquid containing said platinum in the form of anions of a complex acid which comprises placing said liquid in contact with a solid organic anion removal material having a basic nitrogen group and capable of being regenerated with a solution of alkali whereby said platinum in the form of an anionic complex is taken up by said anion removal material, then removing said liquid from contact with said anion removal material, and then separating the platinum metal values from said anion removal material.

5. A process of recovering palladium from an aqueous liquid containing said palladium in the form of anions of a complex acid which comprises placing said liquid in contact with a solid organic anion removal material having a basic nitrogen group and capable of being regenerated with a solution of alkali whereby said palladium in the form of an anionic complex is taken up by said anion removal material, then removing said liquid from contact with said anion removal material, and then separating the palladium metal values from said anion removal material.

6. A process of recovering gold from an aqueous liquid containing said gold in the form of anions of a complex acid which comprises placing said liquid in contact with a solid organic anion removal material having a basic nitrogen group and capable of being regenerated with a solution of alkali whereby said gold in the form of an anionic complex is taken up by said anion removal material, then removing said liquid from contact with said anion removal material, and then separating the gold metal values from said anion removal material.

7. A process of recovering precious metal from an aqueous solution containing said metal in the form of anions of a complex acid which comprises (first) employment of a cyclic process of (a) placing said liquid in contact with a solid organic anion removal material having a basic nitrogen group substantially insoluble in a solution of alkali and capable of being regenerated with a solution of alkali whereby said metal is taken up by said anion removal material, (b) removing said liquid from contact with said anion removal material, (c) bringing the solution of an alkali in contact with said anion removal material whereby some of the precious metal in the form of an anionic complex taken up by the anion removal material is transferred to said solution, (d) removing said solution from contact with said anion removal material, and then (e) evaporating said solution, and (second) heating the anion removal material containing a balance of the precious metal to a temperature high enough to cause combustion of the anion removal material and escape of the products of combustion in gaseous form.

FREDERICK C. NACHOD.